(12) United States Patent
Jin (10) Patent No.: US 6,293,146 B1
(45) Date of Patent: Sep. 25, 2001

(54) WHEEL BALANCING DEVICE FOR A VEHICLE

(76) Inventor: Eul Chun Jin, 958-23, Daechi-Dong, Kangnam-Ku, Seoul (KR)

(*) Notice: Subject to any disclaimer, the term of this patent is extended or adjusted under 35 U.S.C. 154(b) by 0 days.

(21) Appl. No.: 09/340,026

(22) Filed: Jun. 28, 1999

(30) Foreign Application Priority Data

Jan. 28, 1999 (KR) .................................................. 99-2778

(51) Int. Cl.$^7$ .................................................. G01M 1/04
(52) U.S. Cl. .................................................. 73/462; 73/475
(58) Field of Search .................................. 73/462, 473, 475, 73/476, 477

(56) References Cited

U.S. PATENT DOCUMENTS

| | | | |
|---|---|---|---|
| 4,457,172 | * 7/1984 | Mathes et al. | 73/462 |
| 4,759,217 | * 7/1988 | Brihier et al. | 73/462 |
| 5,377,542 | * 1/1995 | McConnell et al. | 73/462 |

FOREIGN PATENT DOCUMENTS 0 836 086 A2    4/1998 (EP).

* cited by examiner

*Primary Examiner*—John E. Chapman
(74) *Attorney, Agent, or Firm*—Bacon & Thomas PLLC (57) ABSTRACT

A wheel balancing device. The device is provided with a pulley rotated by a rotation of a motor through a belt. The device includes a main shaft adapted to rotate with said pulley, a first bearing housing mounted around the main shaft to guide the main shaft, a second bearing housing rotatably supporting the main shaft, a pulse generator mounted near the second bearing housing and a plurality of slots for generating a pulse. A pulse detector is mounted near the pulse generator to detect the pulse signal from the pulse generator. A wheel support on which a wheel is closely supported thereon includes a hollow space. The device includes a deviation stop for preventing the wheel from deviating from the wheel support.

6 Claims, 6 Drawing Sheets

WHEEL BALANCING DEVICE FOR A VEHICLE

BACKGROUND OF THE INVENTION

1. Field of the Invention

The present invention relates to a wheel balancing device for use in a vehicle, more particularly to a wheel balancing device capable of exactly detecting both data for longitudinal and traversal vibrations due to an unbalance of the wheels of a vehicle.

2. Description of the Related Art

Various attempts to reduce an unbalance of wheels of a vehicle have been made. In European Patent No. 0836086 A2 which was filed on Sep. 30, 1997 in the name of Buzzi Carlo, entitled "DEVICE FOR AUTOMATICALLY xCLAMPING WHEELS IN A WHEEL-BALANCING DEVICE", a hollow shaft 17 supports a flange 2 clamping a wheel 1 at its one end, a second shaft 4 being movable in the hollow shaft 17 by a spring having a previous load exerted thereon, and the wheel 1 is clamped when the second shaft 4 is moved away from the clamping flange 2 and the wheel 1 is released therefrom, with the spring being operated when the second shaft 4 is moved to the clamping flange 2 by a hydraulic cylinder 11. The device includes two gas springs 8 parallel to the second shaft 4, with the gas spring 8 being arranged and mounted between a free end 4a of the second shaft 4 and a pulley 9 fixed to the hollow shaft 17.

The balancing device constructed in this manner uses a pair of piezoelectric transducers at a right angle with each other in order to measure balancing data.

However, this type of measurement has a shortcoming in that when the hollow shaft connected to the wheel is rotated, the transducers cannot make an exact measurement of the strain on the shaft.

SUMMARY OF THE INVENTION

It is, therefore, a primary object of the invention to provide to a wheel balancing device capable of exactly and promptly measuring longitudinal and traversal vibrations by a plurality of bearings arranged and mounted on a shaft by directly detecting a strain value of the shaft.

The above and other objects of the invention are accomplished by providing a wheel balancing device for use in a vehicle comprising: a pulley rotated by a rotation of a motor through a belt; a main shaft adapted to rotated with said pulley; a first bearing housing mounted around the main shaft to guide the main shaft; a second bearing housing mounted near the first bearing housing and rotatably supporting the main shaft; a pulse generator mounted near the second bearing housing and having a plurality of slots for generating a pulse; a pulse detector mounted near the pulse generator to detect the pulse signal from the pulse generator; a wheel support on which a wheel is closely supported having a hollow space therewithin and mounted near the pulley; a stop for preventing the wheel from deviating from the wheel support when the wheel rotates, being supported by the wheel support, the deviation stop mounted near the wheel support; a first vibration detection means mounted under the first bearing housing to detect a vibration of the first bearing housing; and a second vibration detection means mounted under the second bearing housing to detect a vibration of the second bearing housing.

In accordance with one aspect of the present invention, a wheel balancing device for use in a vehicle comprises: a first amplifying section for amplifying the signal detected by a first sensing member and a second sensing member; a distance measuring section for measuring a strain of the main shaft by referring to a distance from the first sensing member to a wheel and a distance from the second sensing member to the wheel; a display section for making a display; an alarm section emitting a predetermined alarm; a microprocessor for receiving a signal from a second amplifying section, when an operator switches on a key control, and for allowing the display section to display or allowing the alarm section to emit the alarm or controlling a rotations speed of a motor, on a basis of the signal from the second amplifying section; a door control for opening/closing a door by receiving a signal from the microprocessor; and a motor control for controlling the motor by receiving the signal from the microprocessor.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE PREFERRED EMBODIMENTS

Detailed description of the inventive wheel balancing device is now made with reference to drawings.

Figure 1:
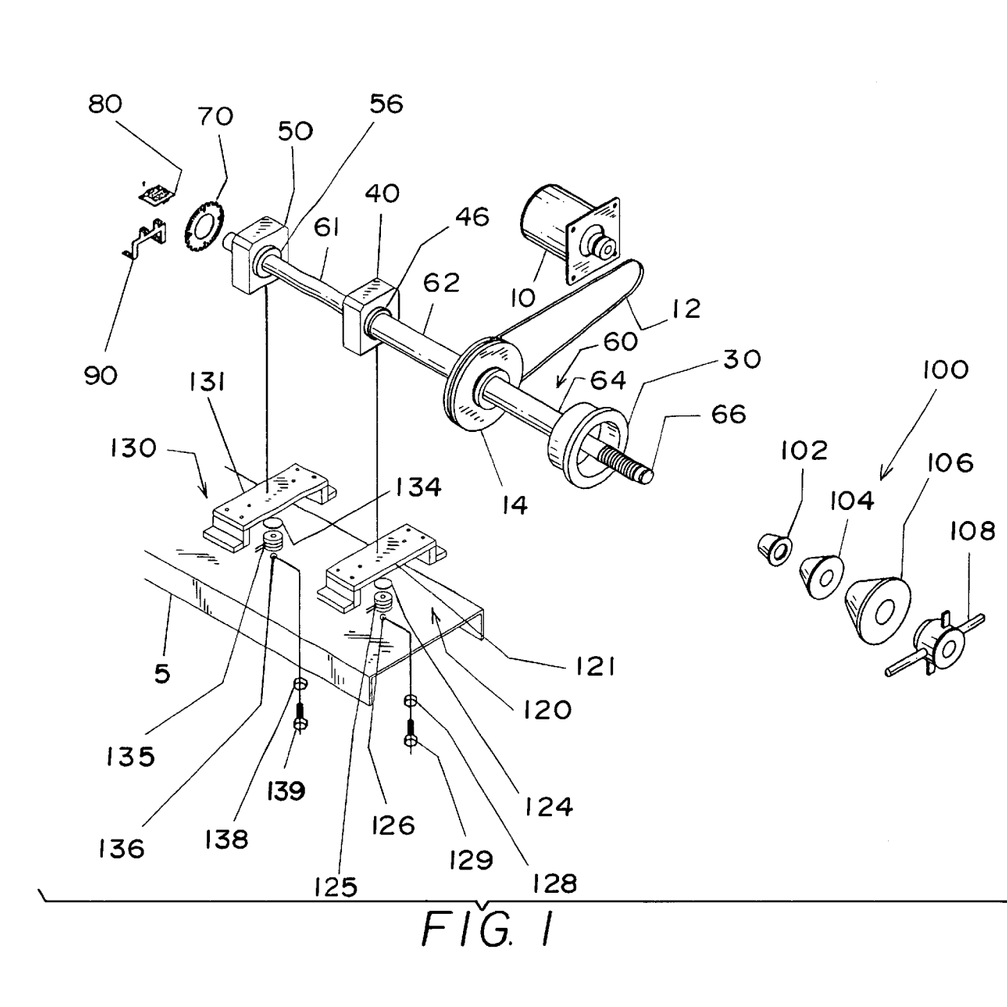
FIG. 1 illustrates an exploded perspective view of a wheel balancing device in accordance with the present invention.
Figure 2:
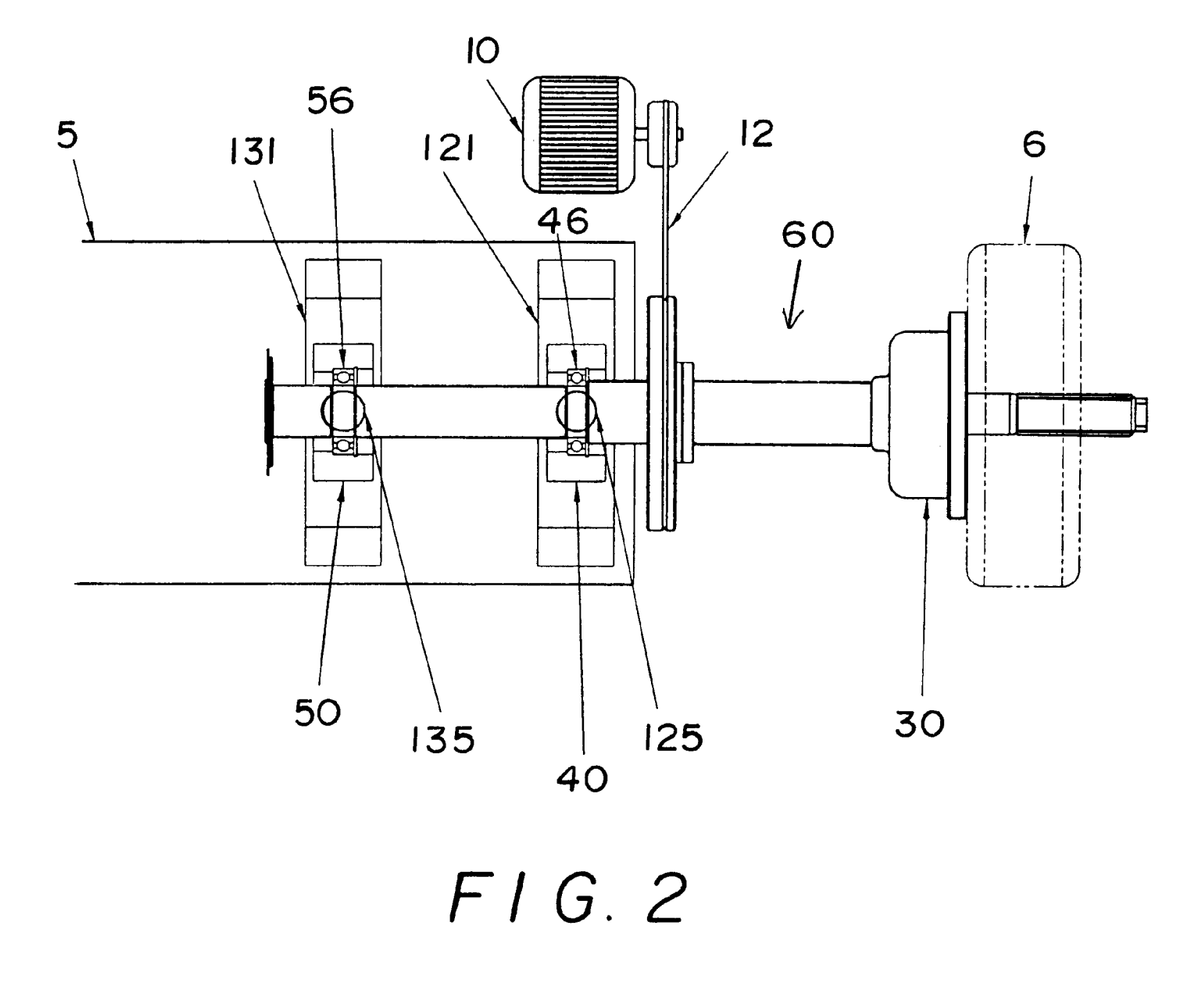
FIG. 2 shows a bottom view of the wheel balancing device in accordance with the present invention.
Figure 3:
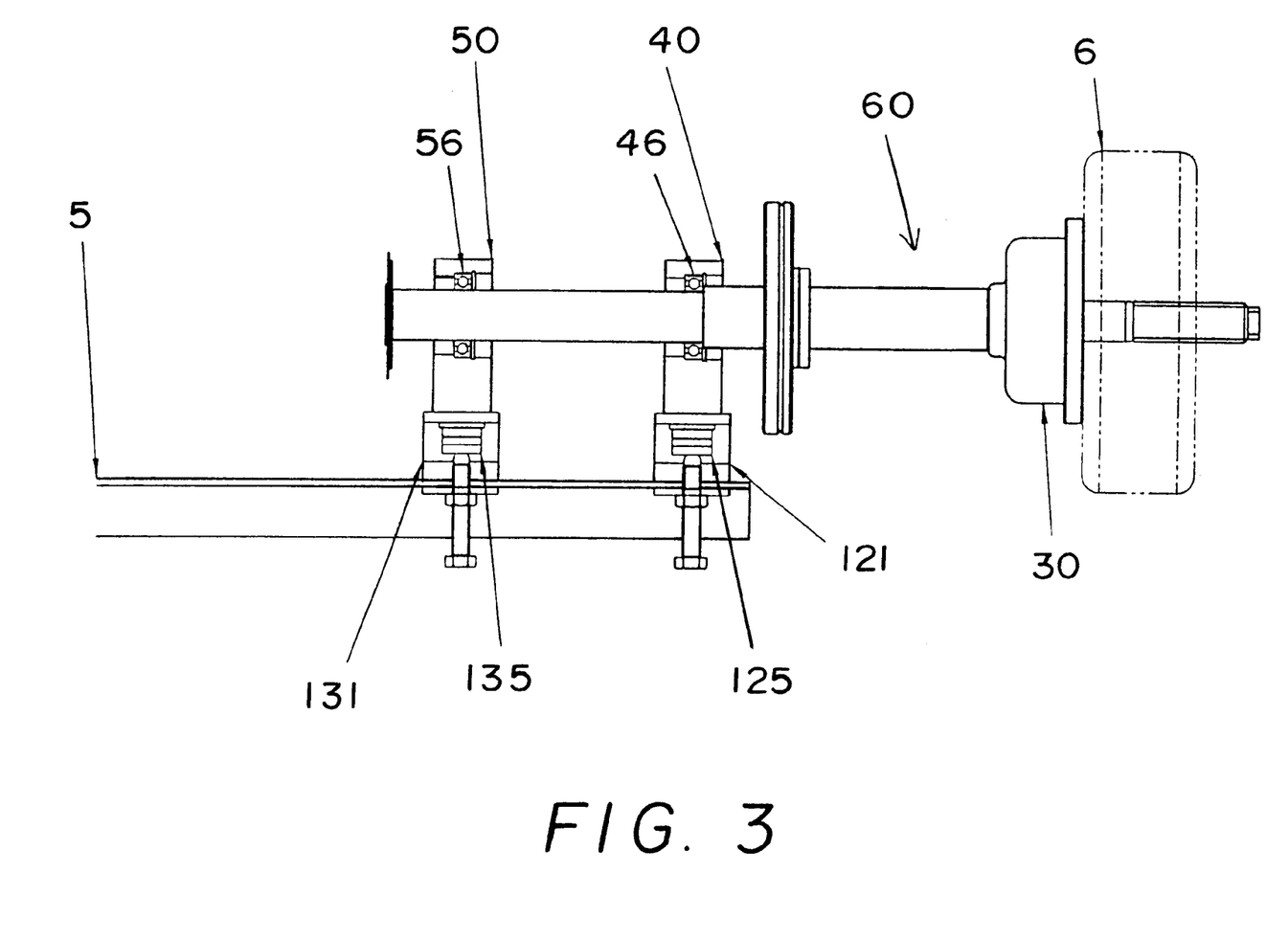
FIG. 3 shows a front elevational view of the wheel balancing device in accordance with the present invention.
Figure 4:
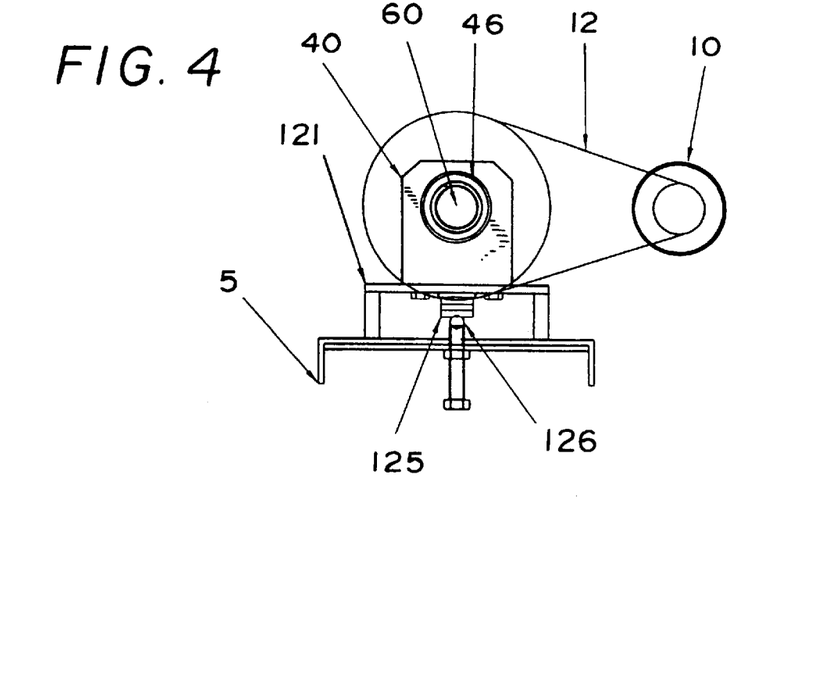
FIG. 4 shows a side elevational view of the wheel balancing device in accordance with the present invention.

FIG. 1 shows an exploded perspective view of the inventive wheel balancing device. The inventive wheel balancing device 200 comprises a motor 10, including a motor shaft, mounted on main frame 5 and is powered by a power source. A belt 12 transmits the rotational force from the motor shaft of the motor 10 to a pulley 14 which is rotated by the belt 12 when the motor 10 rotates. A main shaft 60 is fixed to the pulley and is rotated therewith. A first bearing housing 40 is mounted around the main shaft 60 and acts as a guide for the main shaft 60, allowing the main shaft 60 to rotate with the pulley 14. A second bearing housing 50 is mounted near the first bearing housing 40 and also rotatably supports the main shaft 60. A pulse generator 70 is mounted near the second bearing housing 50 and includes a plurality of slots that are adapted to generate pulses. A pulse detector 80 is mounted near the pulse generator 70 and detects the pulse signals from the pulse generator 70. A wheel support 30 on which a wheel 6 is closely supported thereon includes a hollow space therewithin and mounted on the right side of the pulley 14. A stop 100 prevents the wheel 6 from being loosened from the wheel support 30 when the wheel 6 rotates. The stop 100 is mounted near the wheel support 30. A first vibration detection means or device 120 is mounted under the first bearing housing 40 to detect a vibration of the first bearing housing 40, and a second vibration detection means or device 130 is mounted under the second bearing housing 50 to detect a vibration of the second bearing housing 50.

Figure 5A:
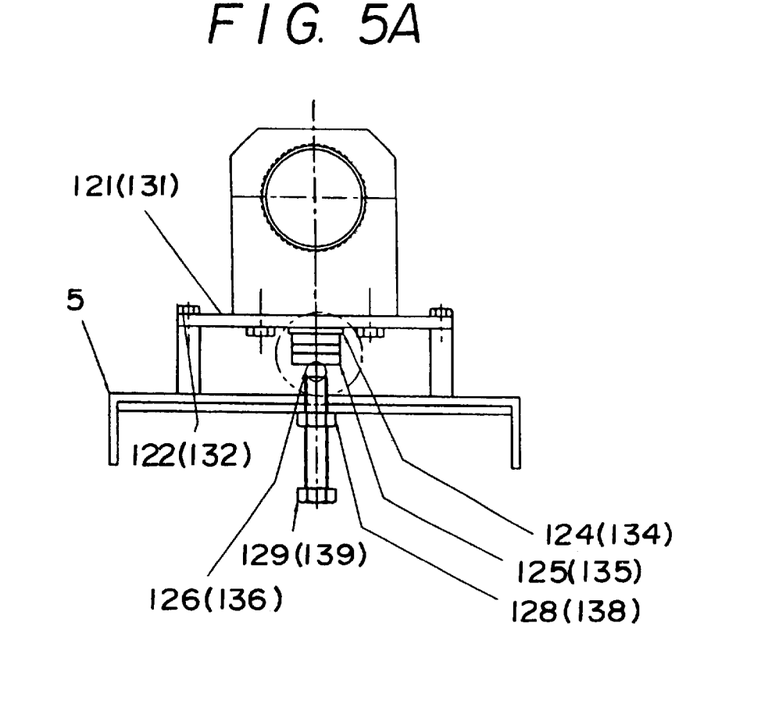
FIG. 5A shows a sectional view of a detecting device of the present invention.
Figure 5B:
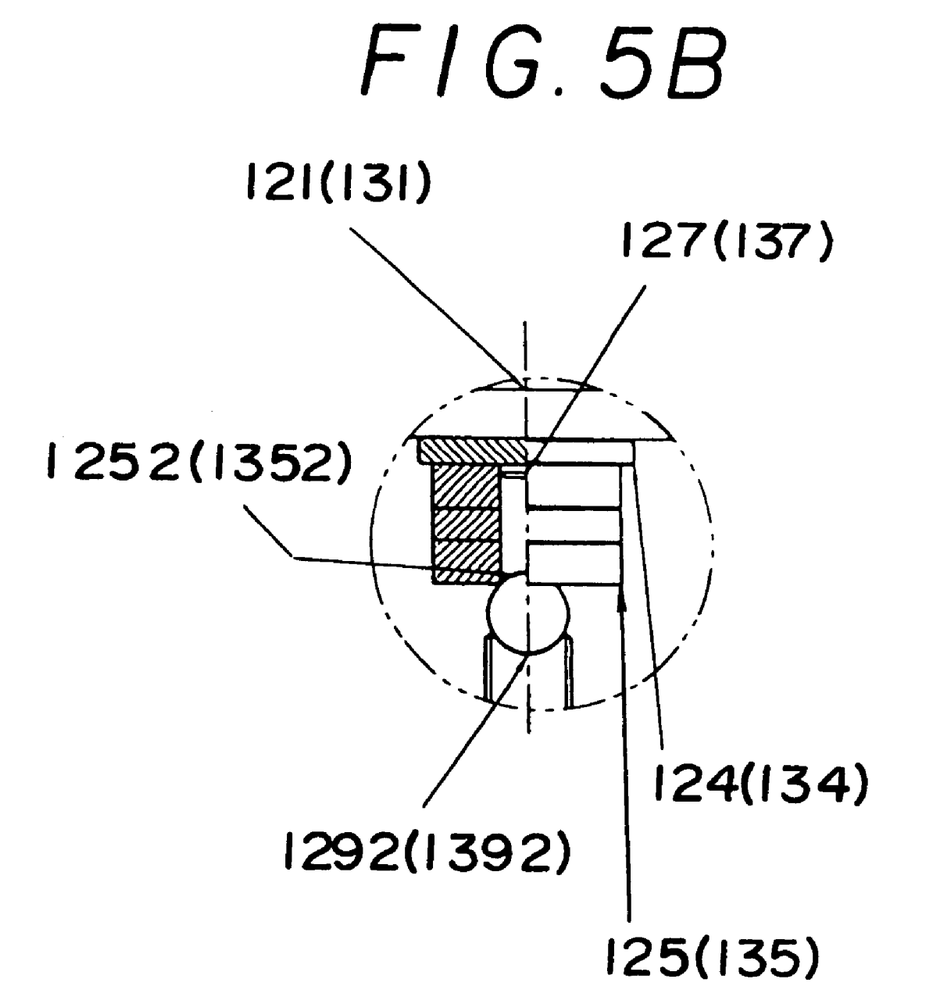
FIG. 5B shows an enlarged view of the dashed circle of FIG. 5A.

As shown in FIG. 5, the first vibration detection means 120 includes a first support frame 121 fixed to the main frame 5 under the first bearing housing 40 by a plurality of fixing elements, a first protuberance 127 is mounted under the center of the first support frame 121 extending downwardly therefrom to protrude above the main frame 5, a first washer 124 is mounted near the first protuberance 127, a first sensing member 125 is mounted under the first washer 124 to detect a vibration transmitted from the main shaft 60 during its rotation, a first ball 126 is mounted under a center of the first sensing member 125 and the ball 126 includes a spherical shape for allowing forces caused by vibrations to be evenly dispersed at predetermined angles to exert on the first sensing member 125 in order to ensure an accurate detection of the vibration by the first sensing member 125, and a first clamping means 129 for maintaining the first sensing member 125 under the first support frame 121, when the first ball 126 is moved up by a force applied thereon and mounted under the first ball 126.

A semi-spherical portion 1252 having a same diameter as that of the first ball 126 is formed on a bottom surface of the first sensing member 125 to receive the first ball 126 of a spherical shape thereon; and a semi-spherical portion 1292 having a same diameter as that of the first ball 126 is also formed on a top surface of the first clamping means 129 mounted under the first ball 126.

Since a center of a diameter of the first protuberance 127 and a center of a diameter of the first washer 124 are aligned with a center of a inner diameter of the first sensing member 125, there is no lateral movement even if the first sensing member 125 vibrates.

As shown in FIG. 5, the first clamping means 129 is inserted underneath and through the main frame 5 and maintained by a first nut 128, firmly pressing the first sensing member 125 upwardly.

As shown in FIG. 5, the second vibration detection means 130 includes a second support frame 131 fixed to the main frame 5 under the second bearing housing 50 by a plurality of fixing elements, a second protuberance 137 mounted under the center of the second support frame 131 extending downwardly to protrude above the main frame 5, a second washer 134 mounted near the second protuberance 137, a second sensing member 135 mounted under the second washer 134 to detect a vibration transmitted from the main shaft 60 during its rotation, a second ball 136 mounted under a center of the second sensing member 135 and having a spherical shape for allowing forces caused by vibrations to be evenly dispersed at predetermined angles to exert on the second sensing member 135 in order to ensure an accurate detection of the vibration by the second sensing member 135, and a second clamping means or device 139 for maintaining the second sensing member 135 under the second support frame 131, when the second ball 136 is moved up by a force applied thereon and mounted under the second ball 136.

A semi-spherical portion 1352 having a same diameter as that of the second ball 136 is formed on a bottom surface of the second sensing member 135 to receive the second ball 136 of a spherical shape thereon; and a semispherical portion 1392 having a same diameter as that of the second ball 136 is also formed on a top surface of the second clamping means 139 mounted under the second ball 136.

Since a center of a diameter of the second protuberance 137 and a center of a diameter of the second washer 134 are aligned with a center of a inner diameter of the second sensing member 135, there's no lateral movement even if the second sensing member 135 vibrates.

As shown in FIG. 5, the second clamping means 139 is inserted from a downside of the main frame 5 and maintained by a second nut 138, firmly pressing the second sensing member 135 upwardly.

A silicon pressure sensor instead of the conventional piezoelectric sensor is used as the first sensing member 125 and the second sensing member 135.

The main shaft 60 comprises a plurality of shafts different from one another in diameter. That is, the main shaft 60, which is rotated by the belt 12, is largely divided into a second shaft 61 positioned in a left side of the first bearing housing 40, a first shaft 62 positioned in a right side of the first bearing housing 40, and a third shaft 64 positioned in a right side of the first shaft 62.

A diameter of the second shaft 61 arranged in the left side of the first bearing housing 40 is smaller than that of the first shaft 62 arranged in the right side of the first bearing housing 40. Preferably, the diameter of the second shaft 61 is 45mm; and the diameter of the first shaft 62 is 55mm. However, changes to the diameters can be made according to the size and use of the products.

The wheel support 30 for supporting the wheel 6 is mounted around the third shaft 64 in the right side of the pulley 14.

The stop 100 mounted near the wheel support 30 to firmly support the wheel 6 includes a first clamping member 102 combined with a fourth shaft 66 extending to the right of the third shaft 64, a second clamping member 104 positioned outside the first clamping member 102, a third clamping member 106 positioned outside the second clamping member 104, and an adjusting member 108 positioned outside the third clamping member 106 to exert a force on the wheel 6 to prevent the wheel 6 from unloosening from the wheel support 30.

Figure 6:
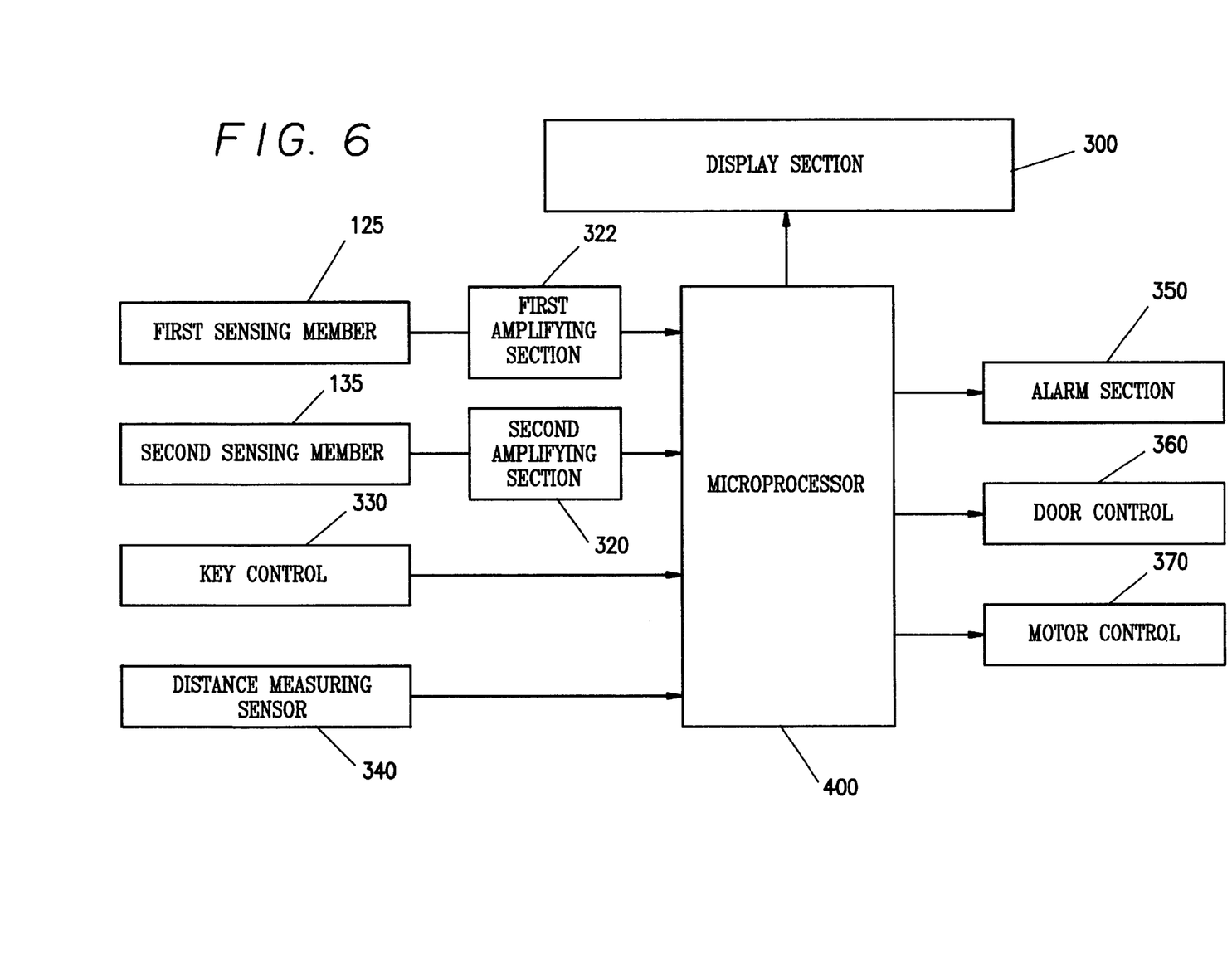
FIG. 6 shows a block diagram showing a control of the inventive wheel balancing device.

FIG. 6 provides a schematic block diagram of the control of the inventive wheel balancing device when the first sensing member 125 of the first detection means 120 and the second sensing member 135 of the second detection means 130, the detection means 120 and 130 are mounted and arranged under the first bearing housing 40 and the second bearing housing 50, respectively. The sensing members 125 and 135 detect longitudinal and traversal vibrations occurring in the main shaft 60 connected to the wheel 6, when the wheel 6 of the vehicle rotates. The detected signal which is relative weak is amplified by a first amplifying section 322.

A distance measuring sensor 340 measures a strain of the main shaft 60 by comparing changes in distance from the first sensing member 135 to the wheel 6 and distance from the second sensing member 125 to the wheel 6.

The signal from a second amplifying section 320 is inputted to a microprocessor 400 and then the microprocessor 400 allows a display section 300 to make a display or allows an alarm section 350 to emit an alarm or controls a rotational speed of the motor 10, on the basis of the signals received. The display section 300 receives a signal from the microprocessor 400 to make a display. The alarm section 350 receives the signal from the microprocessor 400 to emit a predetermined alarm which people can easily perceive, e.g., a voice signal or a particular sound. A control 360 receives the signal from the microprocessor 400 to initiate an action such as to open/close a door (not shown) to the device. A motor control 370 receives the signal from the microprocessor 400 to control the motor 10.

Operation and effect of the present invention constructed in this manner is now described with reference to the accompanying drawings.

In order to examine a wheel balance of the wheel 6 of the vehicle, the wheel 6 of the vehicle is positioned or arranged on the fourth shaft 66 and then the first clamping member 102, the second clamping member 104 and the third clamping member 106 are combined to the fourth shaft 66. Next, the adjusting member 108 is used to allow the wheel 6 of the vehicle to be closely contacted on the wheel support 30.

As described above, after the wheel 6 of the vehicle is closely contacted on the wheel support 30, a switch (not shown) on a control panel is operated to apply the power from the external power source to the motor 10. As a result, the motor 10 rotates.

When the motor 10 rotates, the rotational force from the motor 10 is transmitted to the pulley 14 through the belt 12 connected to the motor 10. The rotational force from the motor 10 finally rotates the main shaft 60 via the rotation of the pulley 14.

The rotation of the main shaft 60 via the pulley 14 rotates the wheel 6 of the vehicle to the right side of the pulley 14, rotating the first shaft 62 being in the left side of the pulley 14 and adapted to rotate with the pulley 14. The rotation of the first shaft 62 rotates a first bearing 46 mounted in the first bearing housing 40.

As described above, if the first bearing 46 mounted and arranged in the first bearing housing 40 is rotated, as shown in FIG. 5, the vibrations are transmitted to the first support frame 121 arranged and installed under the first bearing housing 40 and fixed by a plurality of fixing elements 122. At the same time, the vibrations are transmitted to the first support frame 131 which is arranged and installed under the second bearing housing 50 and fixed by a plurality of fixing elements 132.

The longitudinal and the traversal vibrations transmitted to the first and the second support frames 121 and 131 are finally detected by the first sensing member 125 and the second sensing member 135 which are guided by the first protuberance 127 and the second protuberance 137, respectively, being fixed thereto.

When the second shaft 61 connected at the left side of the first bearing housing 40 and rotating with the first shaft 62 rotates, it is guided by the second bearing housing 50 fixed to the second support frame 131 by the plurality of fixing elements 132.

The rotation of the second shaft 61 rotates a second bearing 56 mounted in the second bearing housing 50 arranged on a lead of the second shaft 61. As shown in FIG. 5, the vibrations are transmitted to the second support frame 131 positioned beneath the second bearing housing 50 and fixed on the main frame 5 by a plurality of fixing elements 132, when the second bearing 56 rotates.

The longitudinal and the traversal vibrations transmitted to the second support frame 131 are guided by the second protuberance 137 protruding from the main frame 5 under the second support frame 131 and are finally detected by the second sensing member 135.

When the first sensing member 125 and the second sensing member 135 detect vibrations, the pulse generator 70 arranged in the left side of the second bearing housing 50 and adapted to rotate with the second shaft 61 generates a pulse signal, being rotated with the second shaft 61.

The pulse signal from the rotating pulse generator 70 is detected by the pulse detector 80 arranged on the support member 90 firmly fixed on the top surface of the main frame 5. Then, the pulse signal is detected by the microprocessor 400. Next, the operator controls the rotational speed of the motor 10.

The distance measuring sensor 340 also measures the level of the vibration by analyzing the pulse signal from the pulse generator 70, an output signal outputted by the operator's controlling a key control 330 and distance values from the wheel 6 of the vehicle to each of the sensing members 125 and 135 and inputs these data to the microprocessor 400.

Detailed description of inputting the plurality of signals to the microprocessor 400 and controlling thereafter has been illustrated above.

The relatively weak signal from the first sensing member 125 mounted under the first bearing housing 40 and detection of the unbalance caused by the rotation of the wheel 6 is amplified by the first amplifying section 322 and then is inputted to the microprocessor 400.

The relatively weak signal from the second sensing member 135 mounted under the second bearing housing 50 and detection of the unbalance caused by the rotation of the wheel 6 is sufficiently amplified by the second amplifying section 320 and then is inputted to the microprocessor 400.

As described above, the present invention is constructed in such a manner that the first bearing housing 40 and the second bearing housing 50 are installed on the main shaft 60 rotated by the motor 10 in order to measure the unbalance of the wheel 6 of the vehicle and the first sensing member 125 and the second sensing member 135 are positioned under the first bearing housing 40 and the second bearing housing 50, respectively. With this construction, when data on the unbalance caused by the rotation of the wheel 6 of the vehicle supported by the wheel support 30 are transmitted through the main shaft 60, it is possible to measure the data without any separate device attached or connected to the first bearing housing 40 and the second bearing housing 50, in the present invention.

When the present invention is constructed in this manner, if the user or operator wants to obtain data on the longitudinal and the traversal vibrations, he can easily and precisely measure even a complicated vibration phenomenon of the wheel of the vehicle since the first bearing and the second bearing mounted around the main shaft directly detect strain value without any intermediate component in the shortest distance.

Although the invention has been shown and described with respect to the preferred embodiments, it will be understood by those skilled in the art that various changes and modifications may be made without departing from the spirit and scope of the invention as defined in the following claims.

What is claimed is:

1. A wheel balancing device for use in a vehicle comprising:
   a pulley rotated by a belt rotated by a motor;
   a main shaft adapted to rotate with said pulley;
   a first bearing housing mounted around the main shaft to guide the main shaft;
   a second bearing housing mounted near the first bearing housing and rotatably supporting the main shaft;
   a pulse generator mounted near the second bearing housing and having a plurality of slots for generating a pulse;
   a pulse detector mounted near the pulse generator to detect the pulse signal from the pulse generator;

a wheel support on which a wheel is closely supported thereon having a hollow space therewithin and mounted near the pulley;

a stop for preventing the wheel from unloosening from the wheel support when the wheel rotates, the stop supported by the wheel support, the stop mounted near the wheel support;

a first vibration detection device mounted under the first bearing housing to detect a vibration of the first bearing housing;

a second vibration detection device mounted under the second bearing housing to detect a vibration of the second bearing housing;

wherein the first vibration detection device includes:
- a first support frame fixed to a main frame under the first bearing housing by a plurality of fixing elements;
- a first protuberance mounted under a center of the first support frame extending downwardly therefrom to protrude above the main frame;
- a first washer mounted near the first protuberance;
- a first sensing member mounted under the first washer to detect a vibration transmitted from the main shaft during its rotation;
- a first ball mounted under a center of the first sensing member to disperse a force due to the vibration to the first sensing member when the first sensing member detects the vibration; and
- a first clamping device mounted under the first ball to maintain the first sensing member under the first support frame by depressing the first ball upwardly.

2. The wheel balancing device of claim 1, wherein a first semi-spherical portion having a same diameter as that of the first ball is formed on a bottom surface of the first sensing member to receive the first ball thereon and a second semi spherical portion having a same diameter as that of the first ball is formed under the first ball.

3. The wheel balancing device of claim 2, wherein the second vibration detection device includes:
- a second support frame fixed to a main frame under the second bearing housing by a plurality of fixing elements;
- a second protuberance mounted under a center of the second support frame extending downwardly therefrom to protrude above the main frame;
- a second washer mounted near the second protuberance;
- a second sensing member mounted under the second washer to detect a vibration transmitted from the main shaft during its rotation;
- a second ball mounted under a center of the second sensing member to disperse a force due to the vibration to the second sensing member when the second sensing member detects the vibration; and
- a second clamping device mounted under the second ball to maintain the second sensing member under the second support frame by depressing the second ball upwardly.

4. The wheel balancing device of claim 3, wherein a second semi-spherical portion having a same diameter as that of the second ball is formed on a bottom surface of the second sensing member to receive the second ball thereon and a second semi spherical portion having a same diameter as that of the second ball is formed under the second ball.

5. The wheel balancing device of claim 1, wherein the first sensing member is a silicon pressure sensor type sensor.

6. The wheel balancing device of claim 3, wherein the second sensing member is a silicon pressure sensor.

* * * * *